Dec. 21, 1954  F. W. B. PORTER  2,697,682
CATALYTIC DESULPHURIZATION OF PETROLEUM HYDROCARBONS
Filed May 23, 1950
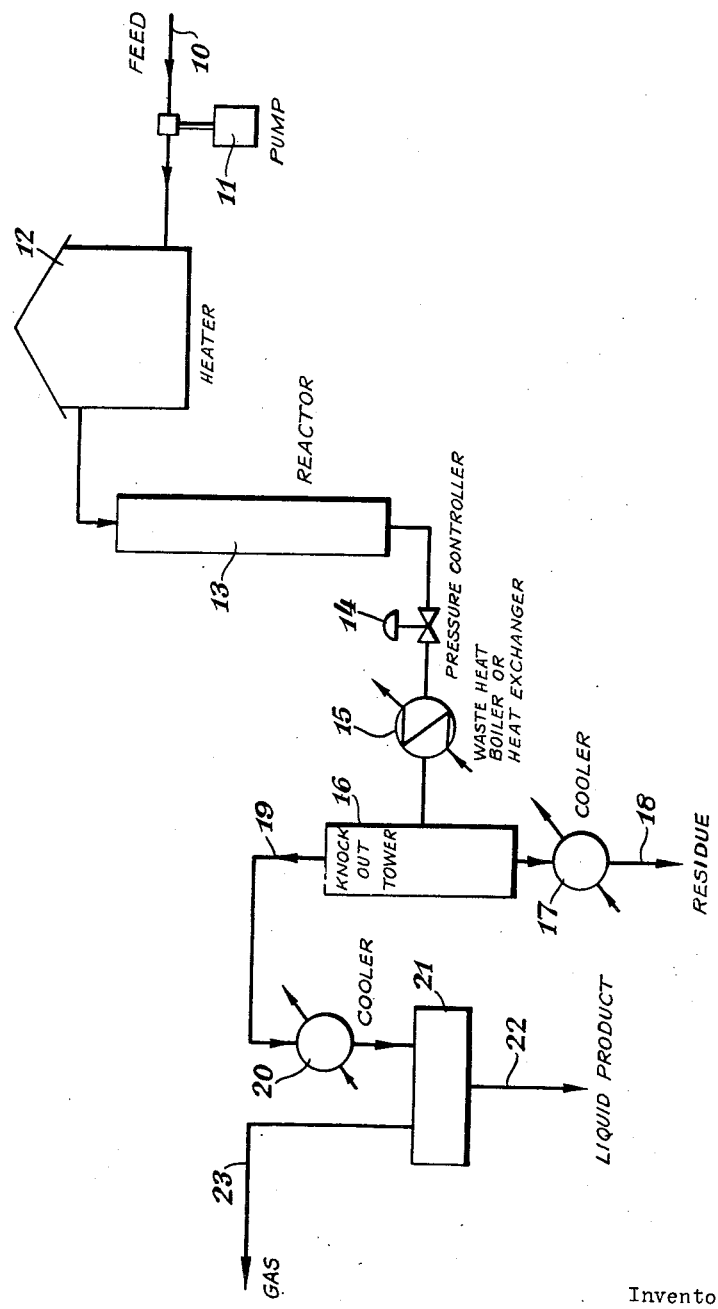
Inventor:
Frederick William Bertram Porter
By Morgan, Finnegan and Durham
Attorneys.

United States Patent Office 2,697,682
Patented Dec. 21, 1954

2,697,682

CATALYTIC DESULFURIZATION OF PETROLEUM HYDROCARBONS

Frederick William Bertram Porter, Sunbury-on-Thames, England, assignor to Anglo-Iranian Oil Company Limited, London, England, a British joint-stock corporation Application May 23, 1950, Serial No. 163,660

Claims priority, application Great Britain May 23, 1949

5 Claims. (Cl. 196—24)

This invention relates to the catalytic desulphurisation of petroleum hydrocarbons.

It is well-known to desulphurise petroleum hydrocarbons by passing them in admixture with hydrogen over a sulphur-resistant hydrogenation catalyst. The process is commonly carried out at elevated temperature in the region of 700° F.–800° F., and at elevated pressure ranging up to 1000 lb./sq. in., and large amounts of hydrogen are recycled to the reaction zone in order to maintain the necessary partial pressure of hydrogen therein, the amount of hydrogen recycled varying between 2000 and 4000 cu. ft./bbl. This process is commonly referred to as a hydrofining process and necessitates the provision of an extraneous source of hydrogen and the use of comparatively expensive steels in the manufacture of the plant in order to withstand the high pressure employed. More recently, a hydrocatalytic desulphurisation process has been evolved which is carried out under conditions such that the hydrogen required is obtained from the feedstock itself by controlled dehydrogenation so that the need for an extraneous source of hydrogen is obviated and furthermore, the process is carried out at a very much lower pressure, thus enabling the plant to be made of inexpensive steel. This process may be referred to as an autofining process and forms the subject of co-pending applications Serial Numbers 35,976, 46,502, 68,416, 100,538 and 94,262, now Patents Numbers 2,573,726, 2,574,445, 2,574,446, 2,574,448 and 2,574,447, respectively, all issued November 6, 1951.

Both the hydrofining and the autofining process are vapour phase reactions and involve the recycling of large amounts of hydrogen-containing gases to the desulphurisation zone, since it has been shown that high hydrogen partial pressures are necessary in order to secure an economic degree of desulphurisation at reasonable space velocities. The plant must therefore include pumps and boosting equipment for maintaining the recycle rate.

It has now been discovered that petroleum hydrocarbons may be efficiently desulphurised by the use of a sulphur-resistant hydrogenation catalyst without the necessity of supplying hydrogen to the desulphurisation zone, and that furthermore, the desulphurisation reaction may be carried out without recycling any hydrogen to the reaction zone. Thus, it has been discovered that if the reaction is carried out under a pressure sufficient to maintain the feedstock substantially in the liquid phase and under controlled temperature conditions, it is possible to remove a considerable proportion of the sulphur contained in the feedstock as $H_2S$ from the treated product. It is believed that when the reaction is carried out under elevated pressure such that the feedstock is maintained substantially in the liquid phase, a small amount of hydrogen present in the reaction zone is sufficient to enable substantial hydrogen pressure to be built up in the reactor, thus enabling hydrogenation of the sulphur-containing molecules to be effected.

According to the invention, the desulphurisation of a petroleum distillate is effected by passing the distillate over a catalyst effective for the dehydrogenation of naphthenes to aromatics and the hydrogenation of organic sulphur compounds and which is not poisoned as a catalyst by the presence of sulphur compounds, under conditions of temperature and pressure such that the distillate is maintained substantially in the liquid phase, and organic sulphur compounds present in the distillate are converted into hydrogen sulphide by means of hydrogen produced by dehydrogenation of naphthenes present in the distillate.

The preferred catalyst consists of a mixture of the oxides of cobalt and molybdenum, or a chemical compound of cobalt, molybdenum and oxygen, or a mixture of one or both of said oxides with said compound, either alone or incorporated with a support.

The temperature should be kept as low as possible to avoid substantial vaporization of the feedstock and preferably within the range 700° F.–800° F., while the pressure may be 500–1000 lb./sq. in. or more depending upon the boiling range of the feedstock.

It will be understood that as the process of the present invention is carried out substantially in the liquid phase, high hydrogen recycle rates are not required for partial pressure purposes and the maintenance of a hydrogen phase is only necessary to achieve adequate desulphurisation.

The process is preferably carried out in a downflow reactor and a suitable plant for carrying out the process is diagrammatically represented in the accompanying drawing.

The feedstock is introduced through line 10 and is fed by means of the pump 11 to a preheater 12 from whence it passes to the top of the reactor 13. The products from the reactor pass via the pressure controller 14 and waste heat boiler or heat exchanger 15 to a knock-out tower 16 in which heavy ends are separated and removed via cooler 17 and line 18. The overhead from the knock-out tower 16 passes via line 19 and cooler 20 to a separator 21 from which liquid product is removed via line 22 and gas via line 23.

The invention will now be described with reference to the following examples.

EXAMPLE 1

Feedstock: Gas oil from Iranian crude having a boiling range of 256–356° C. (A. S. T. M.).

*Process conditions*

Catalyst_____ Cobalt molybdate on alumina.
Temperature (average)_ 780° F.
Pressure (average)_____ 500 p. s. i. ga.
Space velocity_____ 2.0 v./v./hr.
Duration of run_____ 90 hr.
Average gas make_____ 43 C. F./B.

*Inspection data*

|  | Feedstock | Product at 40 hours on stream 3.7% vol. bottoms removed |
|---|---|---|
| Specific Gravity, 60° F./60° F | 0.8635 | 0.8550. |
| I. B. P., ° C | 258 | 104. |
| 10% vol. @ ° C | 278.5 | 257. |
| 50% vol. @ ° C | 303 | 299. |
| 90% vol. @ ° C | 333 | 332. |
| F. B. P., ° C | 356.5 | 360. |
| Colour, A. S. T. M | 3½ minus | 2½ minus. |
| Colour, Lovibond (½″ cell) | 2.8 Y + 1.0 R | 11.7 Y + 0.9 R. |
| Pour Pt., ° F | 20 | 20. |
| Carbon Res. (Conradson) 10% Res. | 0.08 | 0.11. |
| Aniline Pt., ° C | 70.2 | 67.3. |
| Diesel Index | 51 | 52. |
| Cetane No. (Calc.) | 53 | 56. |
| Corrosion (Cu. strip) | No change | No change. |
| Sulphur, percent wt | 1.17 | 0.49. |
| Sulphur Removal, percent |  | 58. |

EXAMPLE 2

Feedstock: A 184–264° C. (A. S. T. M.) boiling range kerosine prepared from Iranian crude.

*Process conditions*

Catalyst _____ Cobalt molybdate on alumina.
Temperature (average)_ 780° F.
Pressure (average) ____ 500 p. s. i. ga.
Space velocity _____ 5.0 v./v./hr.
Average gas make _____ 40 C. F./B.
Duration of run _____ 50 hr.

Inspection data

|  | Feedstock | Bulked Product |
|---|---|---|
| Specific Gravity, 60° F./60° F | 0.8110 | 0.8090 |
| Sulphur, percent wt | 0.299 | 0.044 |
| Sulphur Removal, percent |  | 85.3 |

EXAMPLE 3

Feedstock: Kerosine 184–264° C. (A. S. T. M.) boiling range prepared from Iranian crude.

Process conditions

Catalyst _____ Cobalt molybdate on alumina.
Temperature (average)_ 780° F.
Pressure (average) ____ 1000 p. s. i. ga.
Space velocity _____ 5.0 v./v./hr.
Average gas make _____ 41 C. F./B.
Duration of run _____ 60 hr.

Inspection data

|  | Feedstock | 95% vol. Rerun Bulked Product |
|---|---|---|
| Specific Gravity, 60° F./60° F | 0.8115 | 0.8105. |
| Colour, Saybolt | −1 | +29. |
| Colour Stability | −13 | +23. |
| Mercaptan Sulphur | 0.014 | Dr. Negative. |
| Sulphur, Percent Wt | 0.299 | 0.014. |
| Sulphur Removal, Percent |  | 95.3. |

EXAMPLE 4

Feedstock:
Blend— Boiling range, ° C.
35% vol. naphtha ex Iranian crude__ 145.5–212
20% vol. kerosine ex Iranian crude __ 184–264
45 per cent vol. SO₂ extract ex mixed Iranian and Iraqui crude _____ 160–291

Process conditions

Catalyst _____ Cobalt molybdate on alumina.
Temperature (average)_ 780° F.
Pressure (average) ____ 500 p. s. i. ga.
Space velocity _____ 3.0 v./v./hr.
Average gas make _____ 50 C. F./B.
Duration of run _____ 30 hr.

Inspection data

| A. S. T. M. distn. | Feedstock | 95% vol. Rerun Bulked Product |
|---|---|---|
| I. B. P., ° C | 155 | 144. |
| 10% Vol. at ° C | 167.5 | 161. |
| 50% Vol. at ° C | 194.5 | 185. |
| 90% Vol. at ° C | 243 | 227.5. |
| F. B. P., ° C | 277.5 | 250. |
| Specific Gravity, 60° F./60° F | 0.8275 | 0.8215. |
| Mercaptan Sulphur | 0.024 | <0.001. |
| Doctor Test |  | Negative. |
| Copper Strip @ 50° C |  | No change. |
| Gum Content, mg./100 ml |  | 23. |
| Gum Potential, mg./100 ml |  | 6. |
| Colour, Saybolt |  | +18. |
| Total Sulphur, Percent Wt | 0.552 | 0.074. |
| Sulphur Removal, Percent |  | 86.6. |
| Octane No. (M. M.) | 47.2 | 55.0. |

EXAMPLE 5

Feedstock:
35% vol. naphtha ex Iranian crude, boiling range 145.5–212° C. A. S. T. M.
20% vol. kerosine ex Iranian crude, boiling range 184–264° C. A. S. T. M.
45% vol. SO₂ extract ex mixed Iranian and Iraqui crude, boiling range 160–291° C. A. S. T. M.

Process conditions

Catalyst _____ Cobalt molybdate on alumina.
Temperature (average)_ 780° F.
Pressure (average) ____ 1000 p. s. i. ga.
Space velocity _____ 3.0 v./v./hr.
Average gas make _____ 26 C. F./B.
Duration of run _____ 30 hr.

Inspection data

| A. S. T. M. distn. | Feedstock | 95% Rerun Bulked Product |
|---|---|---|
| I. B. P., ° C | 155 | 135. |
| 10% Vol. at ° C | 167.5 | 160. |
| 50% Vol. at ° C | 194.5 | 189. |
| 90% Vol. at ° C | 243 | 234. |
| F. B. P., ° C | 277.5 | 252. |
| Specific Gravity, 60° F./60° F | 0.8275 | 0.8210. |
| Mercaptan Sulphur | 0.024 | <0.001. |
| Doctor Test |  | Negative. |
| Copper Strip at 50° C |  | No change. |
| Gum Content, mg./100 ml |  | 10. |
| Gum Potential, mg./100 ml |  | 27. |
| Colour, Saybolt |  | +20. |
| Total Sulphur, percent wt | 0.552 | 0.067. |
| Sulphur Removal, percent |  | 87.9. |
| Octane No. (M. M.) | 47.2 | 54.1. |

EXAMPLE 6

Feedstock: Wax distillate boiling range 260–582° C. (A. S. T. M.) prepared from Iranian crude.

Process conditions

Catalyst _____ Cobalt molybdate on alumina.
Temperature (average)_ 780° F.
Pressure (average) ____ 500 p. s. i. ga.
Space velocity _____ 1.0 v./v./hr.
Average gas make _____ 1.0 C. F./B.
Duration of run _____ 24 hr.

Inspection data

|  | Feedstock | Bulked Product |
|---|---|---|
| Specific Gravity, 60° F./60° F | 0.8845 | 0.8670 |
| Sulphur, percent wt | 1.74 | 1.11 |
| Sulphur Removal, percent |  | 36.1 |

EXAMPLE 7.—DESULPHURISATION OF CAT. CRACKED GASOLINE

Feedstock: A 100–230° C. (A. S. T. M.) boiling range gasoline prepared by the catalytic cracking of Iranian wax distillate.

Process conditions

Catalyst _____ Cobalt molybdate on alumina.
Temperature (average)_ 780° F.
Pressure (average) ____ 500 p. s. i. ga.
Space velocity _____ 1.0 v./v./hr.
Average gas make _____ 24 C. F./B.
Duration of run _____ 30 hr.

Inspection data

| A. S. T. M. distn. | Feedstock | Bulked Rerun 200° C. E. P. Product +7 lbs./1,000 Brls. Dupont 22. |
|---|---|---|
| I. B. P., ° C |  | 116.5 |
| 10% Vol. at ° C |  | 135 |
| 50% Vol. at ° C |  | 159 |
| 90% Vol. at ° C |  | 194 |
| F. B. P., ° C |  | 209 |
| Specific Gravity, 60° F./60° F | 0.8460 | 0.8270 |
| Gum E, mg./100 ml |  | 8 |
| Gum E+P, mg./100 ml |  | 10 |
| A. S. T. M. Induction Period, mins |  | 165 |
| Sulphur, Percent Wt | 0.486 | 0.154 |
| Sulphur Removal, Percent |  | 68.3 |

EXAMPLE 8

Feedstock: I. B. P.—350° C. cut prepared from Iranian crude.

*Process conditions*

| | |
|---|---|
| Catalyst | Cobalt molybdate on alumina. |
| Temperature (average) | 780° F. |
| Pressure (average) | 500 p. s. i. ga. |
| Space velocity | 3.0 v./v./hr. |
| Average gas make | 46 C. F./B. |
| Average-sulphur removal | 47.9% |
| Duration of run | 30 hr. |

*Inspection data*

[Fractions prepared from feedstock and bulked product.]

| | Naphtha | | Kerosine | | Gas Oil | |
|---|---|---|---|---|---|---|
| | Feed | Product | Feed | Product | Feed | Product |
| I. B. P., ° C | 75.5 | 75.5 | 191 | 195 | 262 | 276. |
| 10% Vol. at ° C | 101 | 100 | 199.5 | 203 | 277.5 | 288. |
| 50% Vol. at ° C | 127.5 | 126 | 212 | 216 | 295.0 | 303. |
| 90% Vol. at ° C | 161 | 160.5 | 232.5 | 238 | 328 | 333.5. |
| F. B. P., ° C | 181 | 183.5 | 243 | 251 | 353 | 358.5. |
| Specific Gravity, 60° F./60° F | 0.7490 | 0.749 | 0.8065 | 0.8105 | 0.8580 | 0.8625. |
| Bromine No | 1 | 3 | 2 | 3 | | |
| Doctor Test | Positive | Negative | Positive | Sl. Pos | | |
| Copper Strip | No change | No change | No change | No change | No change | No change. |
| Sulphur, percent wt | 0.065 | 0.003 | 0.230 | 0.084 | 1.06 | 0.71. |
| Sulphur Removal, percent | | 95.5 | | 63.5 | | 33.0. |

I claim:

1. A process for the catalytic desulphurization of a petroleum distillate carried out without the necessity of supplying or recycling hydrogen to the distillate undergoing desulphurization, which comprises passing the distillate through a desulphurizing zone over a catalyst therein effective for the dehydrogenation of naphthenes to aromatics and for the conversion of organically combined sulphur into hydrogen sulphide and which is not poisoned as a catalyst by the presence of sulphur compounds, at a selected temperature within the range 700 to 800° F. and at a selected pressure within the range 500 to 1000 lbs./sq. in., said selected temperature and selected pressure being correlated so that the distillate is maintained substantially in the liquid phase and hydrogen is produced by dehydrogenation of naphthenes contained in the distillate in an amount sufficient to build up and maintain a partial pressure of hydrogen in the desulphurizing zone at which conversion of organically combined sulphur in the distillate into hydrogen sulphide will be effected, separating a hydrogen sulphide-containing gas from the treated distillate, and recovering a desulphurized distillate.

2. A process according to claim 1, wherein said catalyst is selected from the class consisting of mixtures of the oxides of cobalt and molybdenum, chemical compounds of cobalt, molybdenum and oxygen, and mixtures of at least one of said oxides with said compounds.

3. A process according to claim 2, wherein said catalyst is incorporated with a support.

4. A process according to claim 3, wherein said support is alumina.

5. A process according to claim 1, wherein the petroleum distillate is selected from the class consisting of kerosine and gas oil.

References Cited in the file of this patent

UNITED STATES PATENTS

| Number | Name | Date |
|---|---|---|
| 2,437,532 | Huffman | Mar. 9, 1948 |
| 2,445,345 | Byrns | July 20, 1948 |
| 2,486,361 | Nahin et al. | Oct. 25, 1949 |
| 2,487,466 | Nahin | Nov. 8, 1949 |
| 2,498,559 | Layng et al. | Feb. 21, 1950 |
| 2,522,065 | Short | Sept. 12, 1950 |
| 2,574,446 | Docksey et al. | Nov. 6, 1951 |
| 2,574,448 | Docksey et al. | Nov. 6, 1951 |
| 2,574,451 | Porter et al. | Nov. 6, 1951 |
| 2,606,141 | Meyer | Aug. 5, 1952 |
| 2,623,007 | Myers | Dec. 23, 1952 |